United States Patent
Jeong et al.

(10) Patent No.: US 12,379,911 B2
(45) Date of Patent: Aug. 5, 2025

(54) APPLICATION INSTALLATION METHOD AND ELECTRONIC DEVICE FOR SUPPORTING SAME

(71) Applicant: SAMSUNG ELECTRONICS CO., LTD., Suwon-si (KR)

(72) Inventors: Kwanhee Jeong, Suwon-si (KR); Sergei Andreevich Lonchakov, Moscow (RU); Ivan Aleksandrovich Titarenko, Moscow (RU); Ivan Stepanovich Maidanskii, Moscow (RU); Gyoungseok Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 18/105,581

(22) Filed: Feb. 3, 2023

(65) Prior Publication Data
US 2023/0185554 A1  Jun. 15, 2023

Related U.S. Application Data

(63) Continuation of application No. PCT/KR2021/010028, filed on Aug. 2, 2021.

(30) Foreign Application Priority Data

Aug. 3, 2020  (KR) .................. 10-2020-0096989

(51) Int. Cl.
  *G06F 8/61*  (2018.01)
  *G06F 9/445*  (2018.01)
(52) U.S. Cl.
  CPC .............. *G06F 8/61* (2013.01); *G06F 9/4451* (2013.01)

(58) Field of Classification Search
CPC . G06F 8/61; G06F 9/4451; G06F 8/60; G06F 9/44; G06F 9/445
(Continued)

(56) References Cited

U.S. PATENT DOCUMENTS 9,348,567 B2  5/2016  Sharma et al.
9,442,707 B2  9/2016  Sathyanathan et al.
(Continued)

FOREIGN PATENT DOCUMENTS

KR  10-2013-0134790 A  12/2013
KR  10-2015-0094166 A  8/2015
(Continued)

OTHER PUBLICATIONS

Ham, English translation of WO-2019083271-A1 (Year: 2019).*
(Continued)

*Primary Examiner* — Bradley A Teets
*Assistant Examiner* — Zengpu We
(74) *Attorney, Agent, or Firm* — Sughrue Mion, PLLC

(57) ABSTRACT

An electronic device includes: a communication circuit; a memory; and a processor operatively connected to the communication circuit and the memory. The processor is configured to: receive an application from an external electronic device through the communication circuit; determine whether a profile related to the application exists in the memory; execute the application in a background state based on a determination that the profile related to the application does not exist in the memory; generate a profile related to the application executed in the background state; and install the application based on the generated profile.

18 Claims, 5 Drawing Sheets

(58) Field of Classification Search
USPC .......................................................... 717/175
See application file for complete search history.

(56) References Cited

U.S. PATENT DOCUMENTS

| | | | |
|---|---|---|---|
| 10,664,251 | B2 | 5/2020 | Barton et al. |
| 11,055,075 | B2 | 7/2021 | Lee |
| 11,327,739 | B2 | 5/2022 | Jeong et al. |
| 11,388,012 | B2 | 7/2022 | Loreskar et al. |
| 11,429,256 | B2 | 8/2022 | Ham |
| 11,442,745 | B1* | 9/2022 | Blackburn ............ G06F 9/4451 |
| 11,449,318 | B2 | 9/2022 | Jeong et al. |
| 2003/0066060 | A1 | 4/2003 | Ford |
| 2010/0175056 | A1 | 7/2010 | Ogawa et al. |
| 2012/0233602 | A1 | 9/2012 | Ramaswamy et al. |
| 2014/0245194 | A1 | 8/2014 | Wright et al. |
| 2014/0298307 | A1 | 10/2014 | Johnson et al. |
| 2015/0365463 | A1* | 12/2015 | Quan .................... G06F 8/61 |
| | | | 709/219 |
| 2015/0378703 | A1* | 12/2015 | Govindaraju ............ G06F 8/20 |
| | | | 717/174 |
| 2017/0346802 | A1* | 11/2017 | Gruskin .................... G06F 8/62 |
| 2018/0039453 | A1 | 2/2018 | Nakajima et al. |
| 2019/0265958 | A1* | 8/2019 | Ayers ...................... G06F 21/45 |

FOREIGN PATENT DOCUMENTS

| | | | | |
|---|---|---|---|---|
| KR | 10-1593583 | * | 2/2016 | ............ G06F 8/40 |
| KR | 10-1593583 | B1 | 2/2016 | |
| KR | 10-1713177 | B1 | 3/2017 | |
| KR | 10-2017-0071360 | A | 6/2017 | |
| KR | 10-2019-0045765 | A | 5/2019 | |
| KR | 10-2020-0046080 | A | 5/2020 | |
| KR | 10-2021-0029621 | A | 3/2021 | |
| KR | 10-2021-0046426 | A | 4/2021 | |
| WO | 2015/183515 | A1 | 12/2015 | |
| WO | WO-2019083271 | A1 * | 5/2019 | ............ G06F 1/163 |

OTHER PUBLICATIONS

Kim et al, English translation-KR-10-1593583 (Year: 2016).*
Communication dated Nov. 29, 2021, issued by the International Searching Authority in counterpart International Application No. PCT/KR2021/010028 (PCT/ISA/210).
Communication dated Nov. 29, 2021, issued by the International Searching Authority in counterpart International Application No. PCT/KR2021/010028 (PCT/ISA/237).
Communication issued on Jan. 21, 2025 by the Korean Intellectual Property Office for Korean Patent Application No. 10-2020-0096989.

* cited by examiner

APPLICATION INSTALLATION METHOD AND ELECTRONIC DEVICE FOR SUPPORTING SAME

CROSS-REFERENCE TO RELATED APPLICATIONS

This application is a by-pass continuation application of International Application No. PCT/KR2021/010028, filed on Aug. 2, 2021, which is based on and claims priority to Korean Patent Application No. 10-2020-0096989, filed on Aug. 3, 2020, in the Korean Intellectual Property Office, the disclosures of which are incorporated by reference herein in their entireties.

BACKGROUND

1. Field

The disclosure relates to an application installation technology, for example, in mobile devices.

2. Description of Related Art

In line with development of computing systems, multiple application programs (hereinafter, referred to as 'applications') operating in electronic devices, such as smartphones, have been produced. Such application may include multiple codes for accomplishing a specific purpose, and may be packaged and distributed. When the application is installed in an electronic device, the codes composed in a programming language may be converted according to the platform supported by the electronic device, and then, the converted codes may be used as a command set for accomplishing the specific purpose. For example, in an electronic device having Android operating system, codes of the application may be compiled based on the runtime environment to be converted into native codes.

Schemes used to compile the codes include an Ahead-Of-Time (AOT) scheme, a Just-In-Time (JIT) scheme, or a hybrid scheme that is a mixture of the AOT scheme and the JIT scheme.

In the AOT scheme, the codes are compiled at a timepoint of installation of an application to be converted into native codes and stored, and the converted native codes are directly retrieved at the application execution timepoint (another timepoint for the application's execution). In the AOT scheme, the codes are already converted into native codes when the application is installed, and this may reduce the application execution time. However, a long application installation time may be necessary, and a large storage space may be necessary to install the application.

In the JIT scheme, when an application is executed, only a necessary code among the codes is compiled at an appropriate timepoint. In the JIT scheme, an operation is conducted in an interpreter type with regard to a loaded class among the codes and, if repeated execution thereof is sensed, the JIT compiler operates appropriately, thereby improving the execution speed. That is, the native code is executed very fast, a memory cache is performed by default, and the performance may thus been maximized when the class is repeatedly recalled. However, In the JIT scheme, the codes are compiled into native codes during a runtime, and the application installation time is thus reduced, but a long application execution time may be necessary. Alternatively or in addition, when codes cached in the memory are released, a time to reconvert the codes is necessary if re-execution regarding the codes is sensed, and the operation of the application may thus be delayed.

In the hybrid scheme, the JIT scheme may be used when installing an application, thereby shortening the application installation time and reducing the application installation space. A profile following a user pattern may be stored through the interpreter, an AOT background daemon may be started by a job scheduler when a specific condition is satisfied such that native codes are generated through background compiling. The native codes may be immediately used when executing the application, thereby shortening the execution time.

Recent electronic devices having Android operating system support an execution environment referred to as Android runtime (hereinafter, referred to as ART), and the ART may use the hybrid scheme. The ART uses a tool referred to as 'dex2oat' in order to compile a dex (dalvik executable) file (a set of codes) of the application. The type of operation in this case may be designated by a configuration value of a compile filter, and the compile filter may be configured based on a profile following a user pattern. That is, in the ART, codes of an application may be compiled based on a compile filter configured based on a profile following a user pattern.

Meanwhile, a content server (e.g., Google Play™ Store) providing Android-based applications may use at least one profile collected from at least one electronic device so as to generate an optimal profile (or core profile) (e.g., cloud profile) appropriate for an application. Upon receiving an application transmission request (download request) from the electronic device, the content server may provide a profile (e.g., cloud profile) related to the application, together with the application. Accordingly, the electronic device may compile a partial code (e.g., byte code) of the application into a native code, based on the profile, when installing the application, thereby guaranteeing the application execution speed.

However, when the existing electronic device installs an application received from the content server, a process of compiling a partial code of the application based on the profile is omitted if no profile related to the application exists, and if the application execution speed may not be guaranteed.

One or more embodiments of the disclosure may provide an application installation method and an electronic device supporting the same when an application is installed. When no profile related to the application exists, the application is executed in a background state, a profile is generated, and the application is installed based on the generated profile.

SUMMARY

According to an aspect of the disclosure, an electronic device includes: a communication circuit; a memory; and a processor operatively connected to the communication circuit and the memory. The processor is configured to: receive an application from an external electronic device through the communication circuit; determine whether a profile related to the application exists in the memory; execute the application in a background state based on a determination that the profile related to the application does not exist in the memory; generate a profile related to the application executed in the background state; and install the application based on the generated profile.

According to another aspect of the disclosure, a method for installing an application by an electronic device, includes: receiving an application from an external electronic device through a communication circuit of the electronic device; determining whether a profile related to the application exists in a memory of the electronic device; executing the application in a background state based on a determination that the profile does not exist in the memory of the electronic device; generating a profile related to the application executed in the background state; and installing the application, based on the generated profile.

According to one or more embodiments of the disclosure, even when installing an application having no profile, the application may be executed in a background state so as to generate a profile, and the application may be installed based on the generated profile, thereby enhancing the application execution performance. Various other advantageous effects identified explicitly or implicitly through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

In connection with description of the drawings, identical or similar components may be given identical or similar reference numerals.

DETAILED DESCRIPTION

Figure 1:
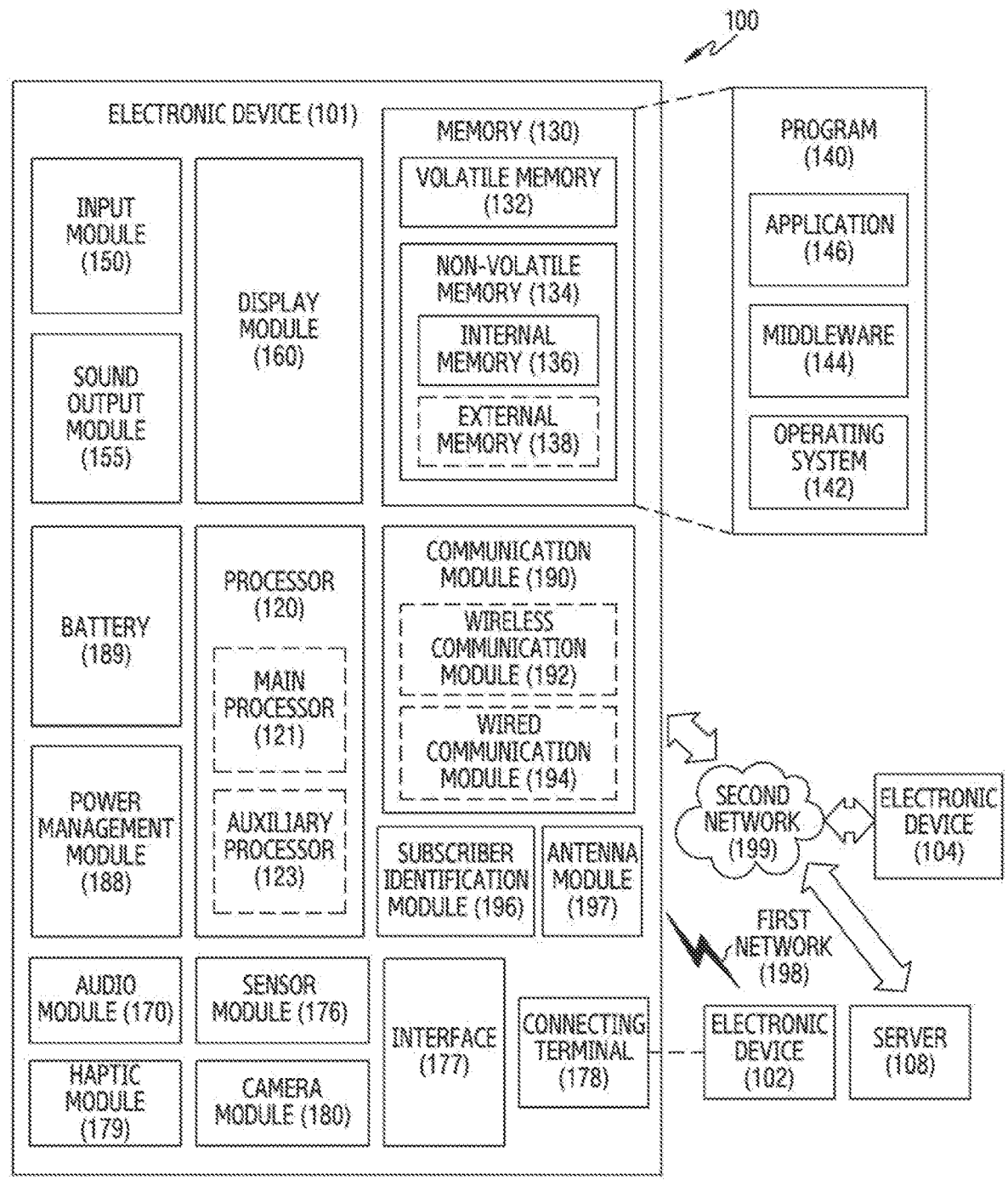
FIG. 1 is a block diagram of an electronic device inside a network environment according to one or more embodiments.

Hereinafter, one or more embodiments of the disclosure will be described with reference to the accompanying drawings. For convenience of description, components may be illustrated in the drawings with exaggerated or reduced sizes, and the disclosure is not necessarily limited by illustration.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. In one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. In one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In one embodiment, the auxiliary processor 123 (e.g., an image signal processor or a communication processor) may be implemented as part of another component (e.g., the camera module 180 or the communication module 190) functionally related to the auxiliary processor 123. In one embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a Deep Neural Network (DNN), a convolutional neural network (CNN), a Recurrent Neural Network (RNN), a Restricted Boltzmann Machine (RBM), a Deep Belief Network (DBN), a Bidirectional Recurrent Deep Neural Network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. In one embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. In one embodiment, the display module 160 may include a touch sensor adapted to detect a touch, or a pressure sensor adapted to measure the intensity of force incurred by the touch.

The audio module 170 may convert a sound into an electrical signal and vice versa. In one embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. In one embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In one embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In one embodiment, the haptic module 179 may include, for example, a motor, a piezoelectric element, or an electric stimulator.

The camera module 180 may capture a still image or moving images. In one embodiment, the camera module 180 may include one or more lenses, image sensors, image signal processors, or flashes.

The power management module 188 may manage power supplied to the electronic device 101. In one embodiment, the power management module 188 may be implemented as at least part of, for example, a Power Management Integrated Circuit (PMIC).

The battery 189 may supply power to at least one component of the electronic device 101. In one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the Application Processor (AP)) and supports a direct (e.g., wired) communication or a wireless communication. In one embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a Power Line Communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., International Mobile Subscriber Identity (IMSI)) stored in the SIM 196.

The wireless communication module 192 may support a 5G network, after a 4G network, and next-generation communication technology, e.g., New Radio (NR) access technology. The NR access technology may support enhanced Mobile BroadBand (eMBB), massive Machine Type Communications (mMTC), or Ultra-Reliable and Low-Latency Communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive Multiple-Input and Multiple-Output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). In one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. In one embodiment, the antenna module 197 may include an antenna including a radiating element composed of a conductive material or a conductive pattern formed in or on a substrate (e.g., a Printed Circuit Board (PCB)). In one embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. In one embodiment, another component (e.g., a radio frequency integrated circuit (RFIC)) other than the radiating element may be additionally formed as part of the antenna module 197.

According to one or more embodiments, the antenna module 197 may form a mmWave antenna module. In one embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, General Purpose Input and Output (GPIO), Serial Peripheral Interface (SPI), or Mobile Industry Processor Interface (MIPI)).

In one embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. In one embodiment, all or some of operations to be executed at the electronic device 101 may be executed at one or more of the external electronic devices 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, Mobile Edge Computing (MEC), or client-server computing technology may be used, for example. The electronic device 101 may provide ultra-low-latency services using, e.g., distributed computing or mobile edge computing. In another embodiment, the external electronic device 104 may include an Internet-of-Things (IoT) device. The server 108 may be an intelligent server using machine learning and/or a neural network. In one embodiment, the external electronic device 104 or the server 108 may be included in the second network 199.

The electronic device 101 may be applied to intelligent services (e.g., smart home, smart city, smart car, or healthcare) based on fifth generation (5G) communication technology or IoT-related technology.

Figure 2:
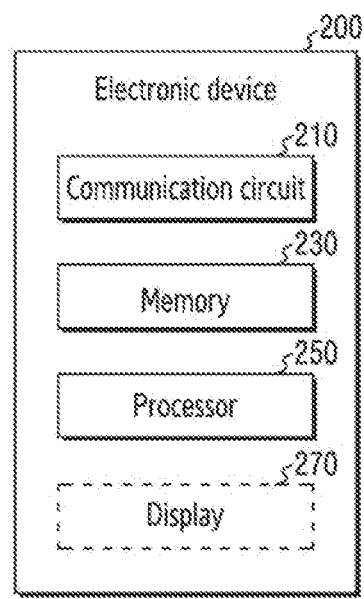
FIG. 2 illustrates the configuration of an electronic device for installing an application according to an embodiment of the disclosure.

FIG. 2 illustrates the configuration of an electronic device for installing an application according to an embodiment of the disclosure.

The electronic device 200 (e.g., electronic device 101 in FIG. 1) may download an application from a content server (e.g., server 108 in FIG. 1) that provides the application, and may install the same. When installing the application, if a profile (e.g., cloud profile) related to the application exists, the electronic device 200 may compile a partial code (e.g., byte code) of the application into a native code, based on the profile, thereby guaranteeing the application execution speed.

In one embodiment, when installing the application, if no profile related to the application exists, the electronic device 200 may execute the application in advance (e.g., execute the same in a background state) so as to generate a profile, and may install the application based on the generated profile. Accordingly, even when installing an application having no profile (e.g., cloud profile), the electronic device 200 may install the application based on a profile generated by executing the application in advance, thereby enhancing the application execution performance.

In FIG. 2, the electronic device 200 for supporting the above-mentioned function may include a communication circuit 210 (e.g., communication module 190 in FIG. 1), a memory 230 (e.g., memory 130 in FIG. 1), and a processor 250 (e.g., processor 120 in FIG. 1). However, the configuration of the electronic device 200 is not limited thereto. According to one or more embodiments, the electronic device 200 may further include at least one other component besides the above-mentioned components. In one embodiment, the electronic device 200 may further include a display 270 (e.g., display module 160 in FIG. 1).

The communication circuit 210 may support communication between the electronic device 200 and an external electronic device (e.g., content server). For example, the electronic device 200 may transmit/receive commands or data with the external electronic device through the communication circuit 210. In one embodiment, the electronic device 200 may receive (or download) the application from a content server that provides the application through the communication circuit 210. In one embodiment, the electronic device 200 may receive a profile (e.g., cloud profile) related to the application from the content server through the communication circuit 210.

The profile may include execution history information regarding at least a partial code (e.g., byte code) included in the application. For example, the profile may include class or method information regarding at least a partial code used in the application execution process. In one embodiment, the profile may include identification information (e.g., flag) which may be used to distinguish execution history regarding the at least partial code. For example, the profile may include at least one among first identification information (e.g., "Startup" flag or "S" flag) that indicates a class or method used at the startup timepoint during the application execution process, second identification information (e.g., "Post Startup" flag or "P" flag) that indicates a class or method used after the startup timepoint during the application execution process, or third identification information (e.g., "Hot" flag or "H" flag) indicating a class or method which has been used with a designated frequency or more during the application execution process.

The memory 230 may store various pieces of data used by at least one component of the electronic device 200. For example, the memory 230 may store a data or commands used by a process or an application program (or application) executed by the processor 250. In one embodiment, the memory 230 may store an application. The application, when received from the content server as a package file (e.g., apk file), may be parsed by the processor 250 such that the code and data included in the package file are separated, and the separated code and data may be stored in the memory 230. In one embodiment, the memory 230 may (temporarily) store a profile related to the application.

The processor 250 may control at least one other component of the electronic device 200, and may perform various kinds of data processing or operation. For example, the processor 250 may execute a command for controlling operations of the communication circuit 210, the memory 230, and/or the display 270.

In one embodiment, the processor 250 may receive (or download) an application from an external electronic device (e.g., content server) through the communication circuit 210. In one embodiment, when a profile related to the received application is stored in the external electronic device, the processor 250 may receive the profile from the external electronic device through the communication circuit 210.

In one embodiment, when installing the application received from the external electronic device, the processor 250 may determine whether a profile related to the application exists. For example, the processor 250 may determine whether a profile related to the application has been received from the external electronic device through the communication circuit 210.

In one embodiment, during installation of the application, when a profile related to the application exists (e.g., when a profile related to the application has been received from the external electronic device), the processor 250 may install the application based on the profile. For example, based on execution history information (e.g., class or method information) regarding at least a partial code (e.g., byte code) of the application included in the profile, the processor 250 may compile the at least partial code in the application installation process, thereby converting the same into a native code. As a result, the native code may be used immediately when executing the application, thereby shortening the execution time. In one embodiment, installation of the application may be performed through a package manager (or installation manager) under the control of the processor 250. The package manager may manage installation or update of the application distributed as a package file (e.g., apk file). For example, the package manager may parse the package file such that the code and data of the application included in the package file are separated and stored in the memory 230.

In one embodiment, during installation of the application, when no profile related to the application exists (e.g., when no profile related to the application has been received from the external electronic device), the processor 250 may execute the application in advance before installing the application. The processor 250 may execute the application in a background state such that the user does not recognize execution of the application. For example, the processor 250 may execute the application such that the application execution screen is not exposed through the display 270. In one embodiment, execution of the application may be performed by an activity manager under the control of the processor 250. The activity manager may manage the life cycle of the application. For example, the activity manager may manage execution and termination of the application.

In one embodiment, the processor 250 may generate a virtual instance for executing the application in the background state. The virtual instance may include an element for executing the application through a virtual display. For example, the virtual instance may include an activity element that uses a resource related to the display 270 without being displayed on the display 270.

In one embodiment, the processor 250 may generate a profile related to the application executed in the background state. For example, the processor 250 may record execution history information regarding at least a partial code (e.g., byte code) included in the application in the profile, in the process of executing the application in the background state. The execution history information regarding at least a partial code may include class or method information regarding the at least partial code used in the application execution process, for example. In one embodiment, the processor 250 may further record identification information (e.g., flag) that can be used to distinguish execution history regarding the at least partial code in the profile. For example, the processor 250 may associate first identification information (e.g., "Startup" flag or "S" flag) with a class or method used at the startup timepoint during the application execution process, and may record the same in the profile; the processor 250 may associate second identification information (e.g., "Post Startup" flag or "P" flag) with a class or method used after the startup timepoint during the application execution process, and may record the same in the profile; and the processor 250 may associate third identification information (e.g., "Hot" flag or "H" flag) with a class or method which has been used with a designated frequency or more during the application execution process, and may record the same in the profile. In one embodiment, the processor 250 may record identification information (e.g., the first identification information, the second identification information, or the third identification information) that can be used to distinguish execution history regarding the at least partial code in the profile, in the process of executing the application in the background state.

In one embodiment, the processor 250 may generate the profile if the application is executed for a designated time (e.g., about 3-4 seconds) in the background state. In addition, after the profile is generated, the processor 250 may end execution of the application. For example, the processor 250 may execute the application for the designated time and then end execution of the application. The designated time is preferably configured such that execution history information regarding at least a partial code included in the application can be acquired sufficiently, without excessively increasing the overall application installation time. For example, the designated time may be a first period of time between a first timepoint at which execution of the application is started and a second timepoint at which the application execution screen is configured, or a second period of time that is the sum of the first period of time and a margin time.

In one embodiment, the processor 250 may generate the profile as a file. In one embodiment, the processor 250 may store the profile in the memory 230. In another embodiment, the processor 250 may temporarily store the profile in the memory 230. For example, if the application is deleted after the profile is stored in the memory 230, the processor 250 may delete the profile together. As another example, if installation of the application is completed after the profile is stored in the memory 230, the processor 250 may delete the profile. In one embodiment, the processor 250 may transmit the generated profile to the external electronic device (e.g., content server) through the communication circuit 210.

In one embodiment, the processor 250 may limit execution of some functions (or a particular function) among the functions of the application when the application is executed in the background state. Some functions (that are limited) may include, for example, at least one of a communication function, a sound function, a notification function, a log output function, a function of reporting errors occurring during execution, or a function of controlling some devices included in the electronic device 200. The communication function uses the communication circuit 210, for example, and may include an Internet access function, a function of using mobile data, or a Bluetooth™ communication function. The sound function may include a function of outputting sounds through speakers of the electronic device 200. The notification function may include a function of displaying an event occurring during execution of the application on the display 270. The log output function may include a function of outputting a log related to execution of the application in the background state. The error reporting function may include a function of displaying information regarding a system interrupt or a crash caused by execution of another application in the background state on the display 270. In connection with the function of controlling some devices included in the electronic device 200, some devices may include, for example, a light generating device (e.g., LED or flash) or a sound generating device (e.g., speaker or buzzer).

In one embodiment, the processor 250 may install the application based on the generated profile. For example, based on execution history information (e.g., class or method information) regarding at least a partial code (e.g., byte code) of the application included in the profile, the processor 250 may compile the at least partial code in the application installation process, thereby converting the same into a native code. As a result, the native code may be used immediately when executing the application, thereby shortening the execution time.

In one embodiment, during installation of the application, when no profile related to the application exists (e.g., when no profile related to the application has been received from the external electronic device), the processor 250 may install the application before executing the application in the background state. For example, the processor 250 may install the application without performing an operation of compiling at least a partial code (e.g., byte code) of the application to convert the same into a native code. In this case, the processor 250 may reinstall the application or recompile at least a partial code of the installed application, based on the profile generated by executing the application in the background state.

In one embodiment, the processor 250 may perform verification of codes included in the application, before executing the application in the background state. In this case, the processor 250 may omit verification of the codes in the process of installing the application based on the generated profile.

In one embodiment, when executing the application in the background state, the processor 250 may assume that a verification of codes included in the application is completed. That is, the processor 250 may execute the application in the background state based on an assumption that verification of codes included in the application is completed. In this case, the processor 250 may verify the codes in the process of installing the application based on the generated profile.

In one embodiment, during installation of the application, if another executed application intensively uses CPU resources (CPU intensive application) (e.g., game application), the processor 250 may install the application without generating a profile related to the application.

In one embodiment, when the application configuration file includes information instructing generation of no profile related to the application, the processor 250 may install the application without generating a profile related to the application. For example, the application configuration file may be a configuration file (e.g., "AndroidManifest.xml") included in the application package file (e.g., apk). In one embodiment, the information instructing generation of no profile related to the application may be drafted in a metadata format (e.g., <meta-data android:name="com.samsung.android.xxx.disabled" android:value="true"/>) in the configuration file.

The display 270 may display various contents (e.g., texts, images, videos, icons, or symbols) to the user. The display 270 may include a touchscreen, and may receive a touch, gesture, proximity, or hovering input made by using an electronic pen or a part of the user's body, for example.

As described above, according to one or more embodiments, an electronic device (e.g., electronic device 200 in FIG. 2) may include a communication circuit (e.g., communication circuit 210 in FIG. 2), a memory (e.g., memory 230 in FIG. 2), a processor (e.g., processor 250 in FIG. 2) operatively connected to the communication circuit and the memory, and the processor may be configured to determine, when installing an application received from an external electronic device through the communication circuit, whether a profile related to the application exists, execute the application in a background state when the profile does not exist, generate a profile related to the application executed in the background state, and install the application, based on the generated profile.

According to one or more embodiments, the processor may be configured to generate a virtual instance for executing the application in the background state.

According to one or more embodiments, the virtual instance may include an activity element configured to use, without being displayed on a display (e.g., display 270 in FIG. 2) of the electronic device, a resource related to the display.

According to one or more embodiments, the processor may be configured to generate a profile related to the application if the application is executed in the background state for a designated time.

According to one or more embodiments, the processor may be configured to end execution of the application if a profile related to the application is generated.

According to one or more embodiments, the processor may be configured to limit execution of some functions among functions of the application when the application is executed in the background state.

According to one or more embodiments, the limited some functions may include at least one of a communication function, a sound function, a notification function, a log output function, a function of reporting errors occurring during execution, or a function of controlling some devices included in the electronic device.

According to one or more embodiments, the processor may be configured to perform verification of codes included in the application before executing the application in the background state, and omit verification of the codes in a process of installing the application, based on the generated profile.

According to one or more embodiments, the processor may be configured to assume that a verification of codes included in the application is completed, when executing the application in the background state, and perform verification of the codes in a process of installing the application, based on the generated profile.

According to one or more embodiments, the processor may be configured to install the application before executing the application in the background state, if the profile does not exist, and reinstall the application, based on the generated profile, or recompile at least a partial code of the installed application.

Figure 3:
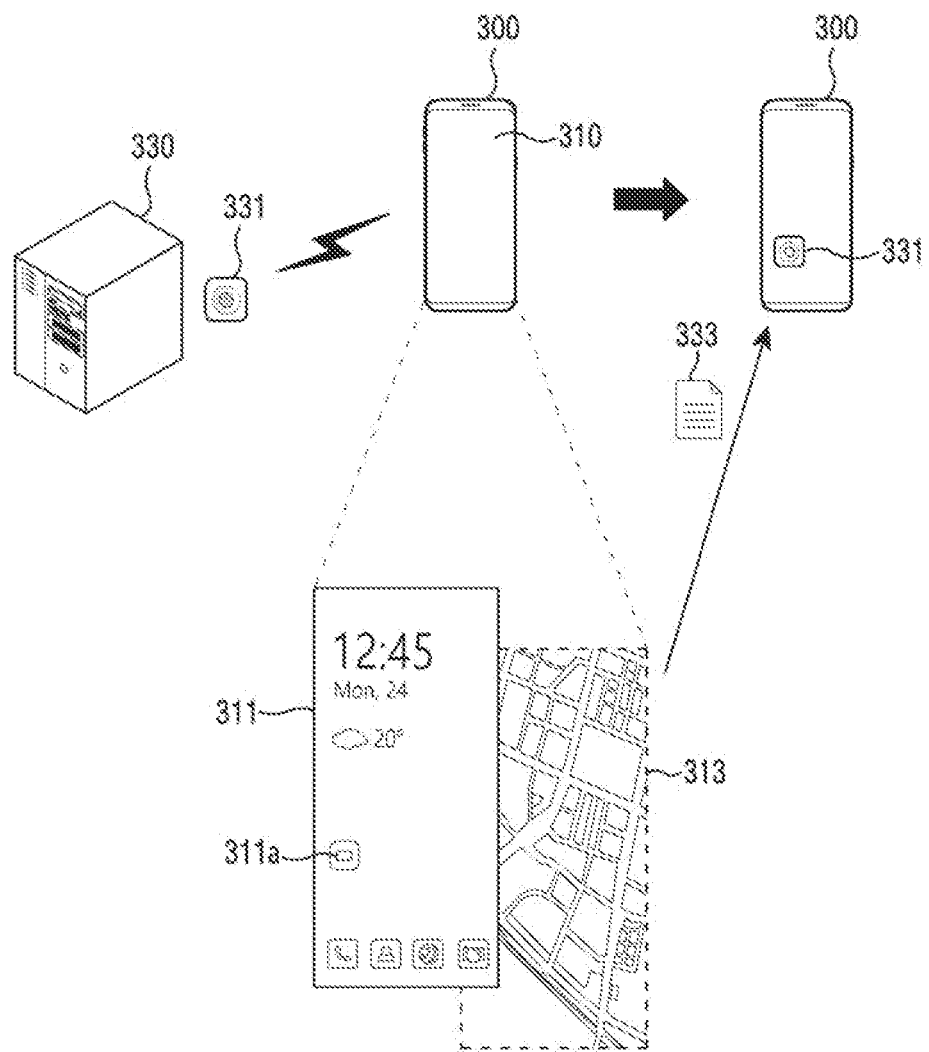
FIG. 3 illustrates a system related to installation of an application according to an embodiment of the disclosure.

FIG. 3 illustrates a system related to installation of an application according to an embodiment of the disclosure.

Referring to FIG. 3, if a request for installation of an application 331 occurs, an electronic device 300 (e.g., electronic device 200 in FIG. 2) may download the application 331 from an external electronic device 330 (e.g., content server) which provides the application 331 through a communication circuit (e.g., communication circuit 210 in FIG. 2) of the electronic device 300 and may install the application 331. The request for installation of the application 331 may occur when the application 331 is selected from a content list received from the external electronic device 330 through a content download application 331a displayed on a screen 311 of a display 310 (e.g., display 270 in FIG. 2), for example.

In one embodiment, in response to the request for installation of the application 331, the electronic device 300 may receive the application 331 from the external electronic device 330 through the communication circuit. In addition, when installing the received application 331, the electronic device 300 may determine whether a profile 333 related to the application 331 exits. For example, the electronic device 300 may determine whether a profile 333 related to the application 331 has been received from the external electronic device 330 through the communication circuit.

In one embodiment, during installation of the application 331, if no profile 333 related to the application 331 exists, the electronic device 300 may execute the application 331 in a background state, thereby generating a profile 333. For example, the electronic device 300 may execute the application 331 in the background state by using a virtual display 313. The virtual display 313 may include an instance configured such that a resource related to the display 310 can be used without being displayed on the display 310, for example.

In one embodiment, the electronic device 300 may execute the application through the virtual display 313 for a designated time (e.g., about 3-4 seconds) and then end execution of the application 331. In the process of executing the application 331 for the designated time, execution history information regarding at least a partial code (e.g., byte code) included in the application 331 may be stored in a memory (e.g., memory 230 in FIG. 2) of the electronic device 300. For example, class or method information regarding the at least partial code used in the process of executing the application 331 may be stored in the memory.

In one embodiment, the electronic device 300 may snapshot execution history information (e.g., class or method information) regarding the at least partial code stored in the memory, thereby generating the profile 333. For example, the electronic device 300 may record execution history information regarding the at least partial code in the profile 333. In one embodiment, the profile 333 may be generated as a file. In one embodiment, the electronic device 300 may process the generated profile 333 into a form that can be used at a compile timepoint.

In one embodiment, after the profile 333 is generated, the electronic device 300 may install the application 331 based on the generated profile 333. In one embodiment, when the application 331 has been installed before being executed in the background state, the electronic device 300 may reinstall the application 331 based on the generated profile 333, or may recompile at least a partial code of the installed application 331.

Figure 4:
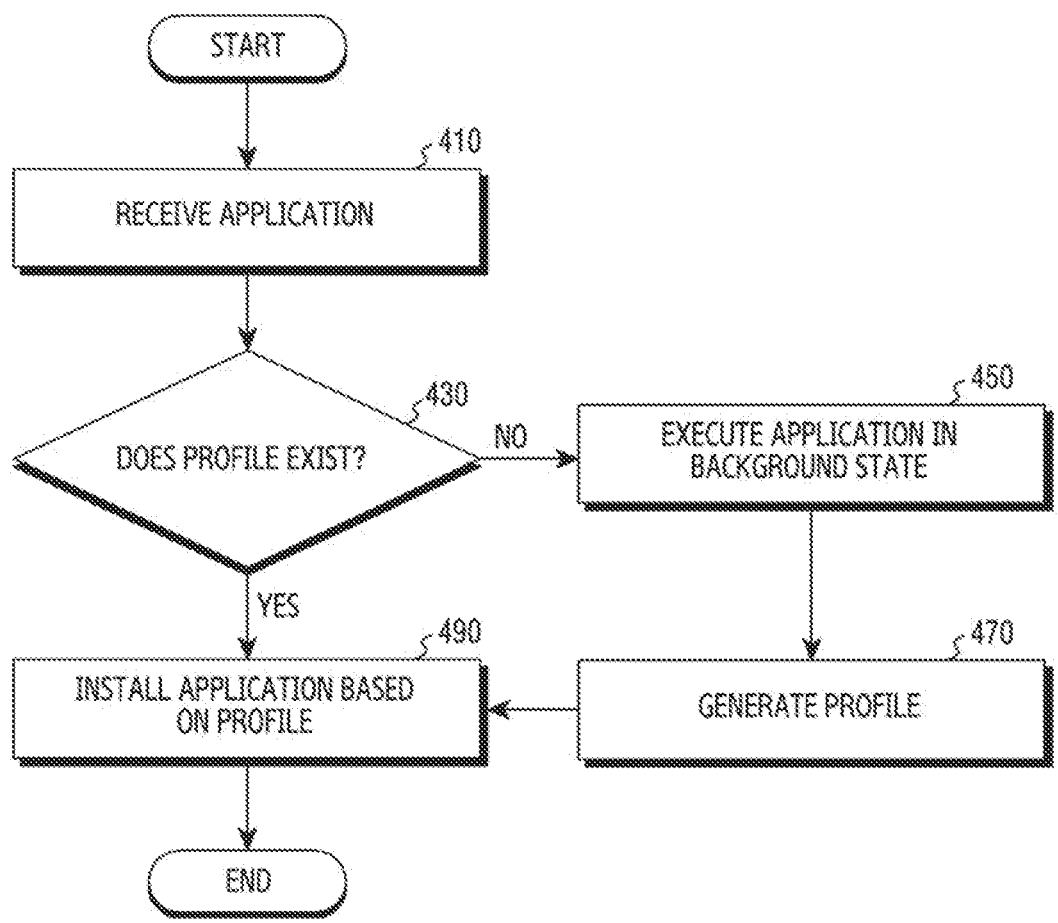
FIG. 4 illustrates a method for installing an application according to an embodiment of the disclosure.

FIG. 4 illustrates a method for installing an application according to an embodiment of the disclosure. Referring to FIG. 4, a processor (e.g., processor 250 in FIG. 2) of an electronic device (e.g., electronic device 200 in FIG. 2) may receive (or download) an application from an external electronic device (e.g., content server) through a communication circuit (e.g., communication circuit 210 in FIG. 2) in operation 410. In one embodiment, when a profile related to the received application is stored in the external electronic device, the processor may receive the profile from the external electronic device through the communication circuit.

In operation 430, the processor may determine whether a profile related to the received application exists. For example, the processor may determine whether a profile related to the application has been received from the external electronic device through the communication circuit.

When the profile exists (e.g., when a profile related to the application has been received from the external electronic device), the processor may install the application based on the profile received from the external electronic device in operation 490. For example, based on execution history information (e.g., class or method information) regarding at least a partial code (e.g., byte code) of the application included in the profile received from the external electronic device, the processor may compile the at least partial code in the application installation process, thereby converting the same into a native code. As a result, the native code may be used immediately when executing the application, thereby shortening the execution time.

When the profile does not exist (e.g., when a profile related to the application has not been received from the external electronic device), the processor may execute the received application in a background state in operation 450. For example, the processor may execute the application such that the application execution screen is not disposed through the display (e.g., display 270 in FIG. 2).

In one embodiment, the processor may generate a virtual instance for executing the application in the background state. The virtual instance may include an element for executing the application through a virtual display. For example, the virtual instance may include an activity element that uses a resource related to the display, without being displayed on the display.

In operation 470, the processor may generate a profile related to the application in the background state. For example, in the process of executing the application in the background state, the processor may generate execution history information regarding at least a partial code (e.g., byte code) included in the application as the profile. The history information regarding the at least partial code may include, for example, class or method information regarding the at least partial code used in the application execution process.

In one embodiment, the processor may generate the profile if the application is executed for a designated time (e.g., about 3-4 seconds) in the background state. In addition, after the profile is generated, the processor may end execution of the application. For example, the processor may execute the application for the designated time and then end execution of the application.

In one embodiment, the processor may limit execution of some functions among the functions of the application when the application is executed in the background state. Some functions that are limited may include, for example, at least one of a communication function, a sound function, a notification function, a log output function, a function of reporting errors occurring during execution, or a function of controlling some devices (e.g., Liquid Emitting Diode (LED), flash, or buzzer) included in the electronic device.

After the profile is generated, the processor may install the application, based on the generated profile, in operation 490. For example, based on execution history information (e.g., class or method information) regarding at least a partial code (e.g., byte code) of the application included in the generated profile, the processor may compile the at least partial code in the application installation process, thereby converting the same into a native code. As a result, the native code may be used immediately when executing the application, thereby shortening the execution time.

In one embodiment, the processor may install the application before executing the application in the background state (before performing operation 450). For example, the processor may install the application without performing the operation of compiling a partial code (e.g., byte code) of the application to convert the same into a native code. In this case, the processor may reinstall the application or recompile at least a partial code of the installed application, based on the profile generated by executing the application in the background state, in operation 490.

In one embodiment, the processor may perform verification of codes included in the application, before executing the application in the background state (before performing operation 450). In this case, the processor may omit verification of the codes in the process of installing the application based on the generated profile, in operation 490.

In one embodiment, when executing the application in the background state (in operation 450), the processor may assume that codes included in the application is completed. That is, the processor may execute the application in the background state based on an assumption that verification of codes included in the application is completed. In this case, the processor may perform verification of the codes in the process of installing the application based on the generated profile in operation 490.

In one embodiment, during installation of the application, if another application being executed intensively uses CPU resources (CPU intensive application) (e.g., game application), the processor may not perform operations (e.g., operations 430 to 470) of generating a profile related to the application, and may install the application with no consideration of the profile, in operation 490.

In one embodiment, when the application configuration file includes information instructing generation of no profile related to the application, the processor may not perform operations (e.g., operations 430 to 470) of generating a profile related to the application, and may install the application with no consideration of the profile, in operation 490.

Figure 5:
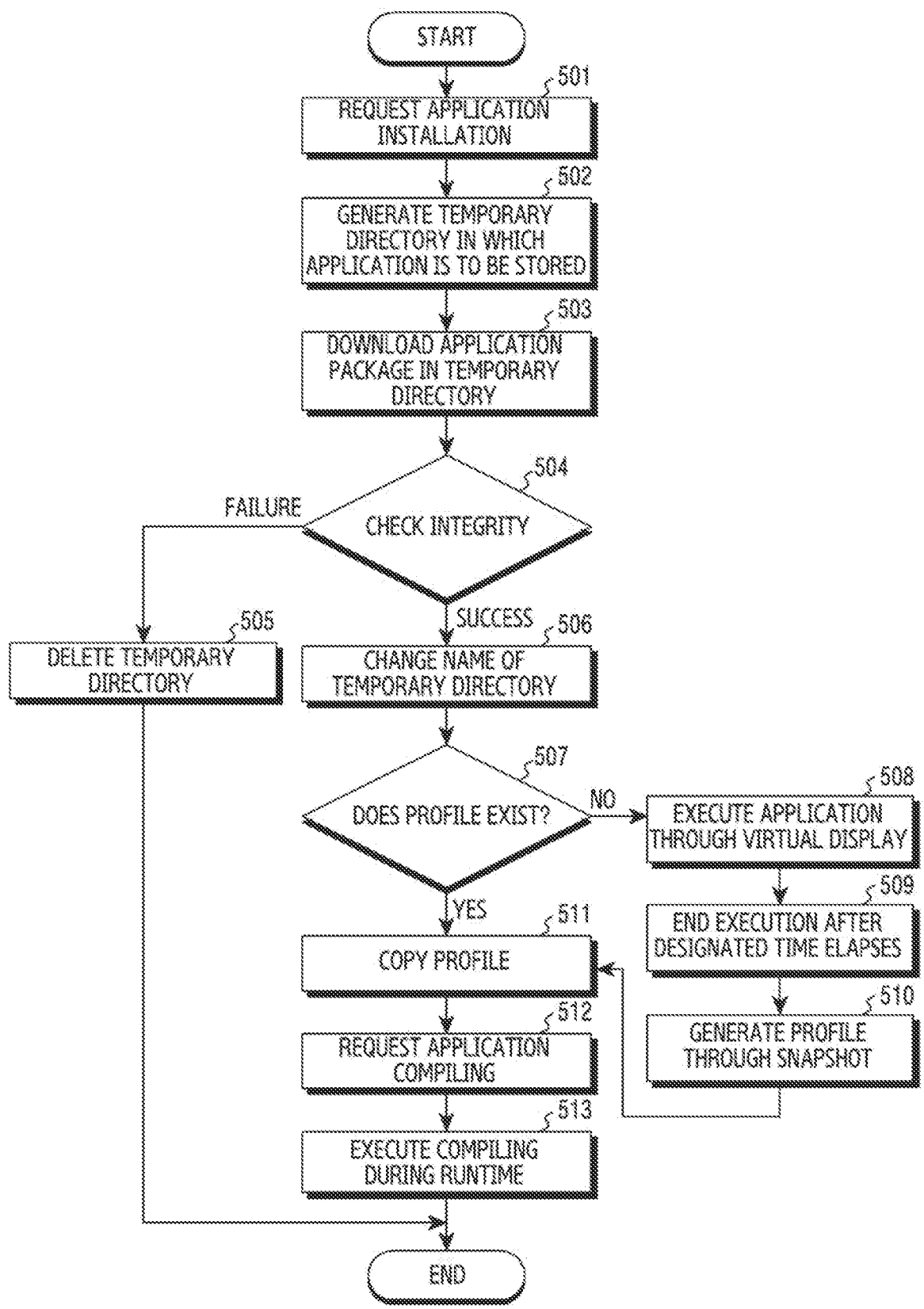
FIG. 5 illustrates a process of installing an application according to an embodiment of the disclosure.

FIG. 5 illustrates a process of installing an application according to an embodiment of the disclosure. Referring to FIG. 5, a processor (e.g., processor 250 in FIG. 2) of an electronic device (e.g., electronic device 200 in FIG. 2) may receive an application installation request in operation 510. The application installation request may be received when the application is selected from a content list received from an external electronic device (e.g., content server) through a content download application installed in the electronic device, for example.

In operation 502, the processor may generate a temporary directory in which the application requested to be installed will be stored in a memory (e.g., memory 230 in FIG. 2). In addition, after the temporary directory is generated, the processor may download the application from the external electronic device through a communication circuit (e.g., communication circuit 210 in FIG. 2) and may store the same in the temporary directory in operation 503. The application may be downloaded as a package file.

After downloading the application, the processor may check the integrity of the application in operation 504. For example, the processor may perform verification of codes included in the application.

If the application integrity check fails (e.g., if verification of codes included in the application fails), the processor may delete the temporary directory in operation 505. In one embodiment, the processor may also delete the application stored in the temporary direction in the process of deleting the temporary directory.

If the application integrity check succeeds (e.g., if verification of codes included in the application succeeds), the processor may change the name of the temporary directory in operation 506. For example, the processor may change the name of the temporary directory to the name of the application.

In operation 507, the processor may determine whether there exists a profile related to the application. For example, the processor may determine whether a profile related to the application has been received from the external electronic device through the communication circuit. As another example, the processor may confirm whether a profile exists in the application package file received from the external electronic device.

If the profile does not exist, the processor may execute the application through a virtual display in operation 508. For example, the processor may execute the application in a background state by using the virtual display such that the user does not recognize execution of the application. The virtual display may include an instance configured such that a resource related to the display can be used without being displayed on the display (e.g., display 270 in FIG. 2).

In operation 509, the processor may end execution of the application after a designated time has elapsed. For example, the processor may execute the application through the virtual display for the designated time and then end execution of the application. In the processor executing the application for the designated time, execution history information regarding at least a partial code (e.g., byte code)

included in the application may be stored in the memory. For example, class or method information regarding the at least partial code used in the application execution process may be stored in the memory.

In operation 510, the processor may generate a profile through a snapshot. The processor may snapshot execution history information (e.g., class or method information) regarding the at least partial code stored in the memory, thereby generating the profile. For example, the processor may record execution history information regarding the at least partial code in the profile. The description that the profile is generated through a snapshot means that data stored in a specific memory space at a specific timepoint is stored (or dumped) in the profile. In one embodiment, the profile may be generated as a file. In one embodiment, the processor may process the generated profile into a form that can be used at a compile timepoint.

In operation 511, the processor may copy the profile. For example, when it is determined in operation 507 that the profile exists, the processor may copy the profile. As another example, if the profile is generated as a result of performing operation 510, the processor may copy the generated profile.

In operation 512, the processor may request compiling of the application. For example, the processor may request compiling of at least a partial code included in the application, based on the copied profile.

In operation 513, the processor may perform compiling during a runtime. For example, the processor may compile the at least partial code, which has been requested to be compiled, during the runtime.

In one embodiment, the processor may determine whether a resultant (e.g., compiled file) has been generated as a result of compiling the at least partial code. If the resultant has been generated successfully, the processor may complete installation of the application. If generation of the resultant has failed, the processor may delete the temporary directory as in operation 505. The resultant generated as a result of compiling may include at least one of a file having an extension "vdex", a file having an extension "odex", or a file having an extension "art", for example. The file having an extension "vdex" may include, for example, an uncompressed DEX code of the application package and additional metadata for increasing the speed of identification. The file having an extension "odex" may include, for example, an AOT-compiled code used for the method of the application package. The file having an extension "art" may include, for example, some character strings enumerated in the application package for increasing the application starting speed, and an ART inside expression of the class.

As described above, according to one or more embodiments, a method for installing an application by an electronic device (e.g., electronic device 200 in FIG. 2) may include an operation of determining, when installing an application received from an external electronic device through a communication circuit (e.g., communication circuit 210 in FIG. 2) of the electronic device, whether a profile related to the application exists (e.g., operation 430 in FIG. 4 or operation 507 in FIG. 5), an operation of executing the application in a background state when the profile does not exist (e.g., operation 450 in FIG. 4 or operation 508 in FIG. 5), an operation of generating a profile related to the application executed in the background state (e.g., operation 470 in FIG. 4 or operation 510 in FIG. 5), and an operation of installing the application, based on the generated profile (e.g., operation 490 in FIG. 4).

According to one or more embodiments, the operation of executing the application in the background state may include an operation of generating a virtual instance for executing the application in the background state.

According to one or more embodiments, the virtual instance may include an activity element configured to use, without being displayed on a display (e.g., display 270 in FIG. 2) of the electronic device, a resource related to the display.

According to one or more embodiments, the operation of generating a profile related to the application may include an operation of generating a profile related to the application if the application is executed in the background state for a designated time.

According to one or more embodiments, the method for installing an application may further include an operation of ending execution of the application if a profile related to the application is generated (e.g., operation 509 in FIG. 5).

According to one or more embodiments, the operation of executing the application in the background state may include an operation of limiting execution of some functions among functions of the application.

According to one or more embodiments, the limited some functions may include at least one of a communication function, a sound function, a notification function, a log output function, a function of reporting errors occurring during execution, or a function of controlling some devices included in the electronic device.

According to one or more embodiments, the method for installing an application may further include an operation of performing verification of codes included in the application before executing the application in the background state, and verification of the codes may be omitted in the operation of installing the application, based on the generated profile.

According to one or more embodiments, the method for installing an application may further include an operation of deeming verification of codes included in the application completed, when executing the application in the background state, and verification of the codes may be performed in the operation of installing the application, based on the generated profile.

According to one or more embodiments, the method for installing an application may further include an operation of installing the application before executing the application in the background state, if the profile does not exist, and the operation of installing the application, based on the generated profile, may include an operation of reinstalling the application, based on the generated profile, or recompiling at least a partial code of the installed application.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, In one embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In one embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit;
memory storing instructions; and
at least one processor,
wherein the instructions, executed individually or collectively by the at least one processor, cause the electronic device to:
receive an application from an external electronic device through the communication circuit;
determine whether a profile related to the application exists in the memory;
by generating a virtual instance to execute the application through a virtual display, execute the application in a background state based on a determination that the profile related to the application does not exist in the memory;
generate the profile related to execution history of a bytecode of the application executed in the background state, wherein the profile comprises classes and methods that have been called more than a threshold number of times during execution of the application; and
install the application based on the generated profile which includes a partial code, without compiling the partial code;
wherein the profile related to the application does not correspond to a Just-In-Time (JIT) code of a JIT scheme.

2. The electronic device of claim 1, wherein:
the instructions, executed individually or collectively by the at least one processor, cause the electronic device to generate the virtual instance for executing the application in the background state,
the virtual instance comprises an activity element configured to use a resource related to a display of the electronic device, and
the activity element is not displayed on the display.

3. The electronic device of claim 1, wherein the instructions, executed individually or collectively by the at least one processor, cause the electronic device to generate the profile related to the application, based on the application executed in the background state for a designated time.

4. The electronic device of claim 3, wherein the instructions, executed individually or collectively by the at least one processor, cause the electronic device to end execution of the application based on the generated profile related to the application.

5. The electronic device of claim 1, wherein the instructions, executed individually or collectively by the at least one processor, cause the electronic device to limit execution of one function among functions of the application based on the application executed in the background state.

6. The electronic device of claim 5, wherein the limited one function comprises at least one of a communication function, a sound function, a notification function, a log output function, a function of reporting errors occurring during execution, or a function of controlling devices included in the electronic device.

7. The electronic device of claim 1, wherein the instructions, executed individually or collectively by the at least one processor, cause the electronic device to:
verify codes of the application before executing the application in the background state; and
omit verification of the codes in a process of installing the application, based on the generated profile.

8. The electronic device of claim 1, wherein the instructions, executed individually or collectively by the at least one processor, cause the electronic device to:
assume that a verification of codes of the application is completed, when executing the application in the background state; and
verify the codes in a process of installing the application, based on the generated profile.

9. The electronic device of claim 1, wherein the instructions, executed individually or collectively by the at least one processor, cause the electronic device to reinstall the application, based on the generated profile, or recompile at least a partial code of the installed application.

10. A method for installing an application by an electronic device, the method comprising:
receiving the application from an external electronic device through a communication circuit of the electronic device;
determining whether a profile related to the application exists in a memory of the electronic device;
by generating a virtual instance to execute the application through a virtual display, executing the application in a background state based on a determination that the profile does not exist in the memory of the electronic device;
generating the profile related to execution history of a bytecode of the application executed in the background state, wherein the profile comprises classes and methods that have been called more than a threshold number of times during execution of the application; and
installing the application, based on the generated profile which includes a partial code, without compiling the partial code;
wherein the profile related to the application does not correspond to a Just-In-Time (JIT) code of a JIT scheme.

11. The method of claim 10, wherein the executing of the application in the background state comprises generating the virtual instance for executing the application in the background state, and
the virtual instance comprises an activity element configured to use, without being displayed on a display of the electronic device, a resource related to the display.

12. The method of claim 10, wherein the executing of the application in the background state comprises limiting execution of one function among functions of the application.

13. The method of claim 10, further comprising performing verification of codes included in the application before executing the application in the background state,
wherein verification of the codes is omitted in the installing of the application, based on the generated profile.

14. The method of claim 10, further comprising assuming verification of codes included in the application completed, when executing the application in the background state,
wherein verification of the codes is performed in the installing of the application, based on the generated profile.

15. The method of claim 10, wherein the installing of the application, based on the generated profile, comprises reinstalling the application, based on the generated profile, or recompiling at least a partial code of the installed application.

16. The method of claim 10, wherein the generating of the profile related to the application comprises generating the profile related to the application based on the application executed in the background state for a designated time.

17. The method of claim 16, further comprising ending executing of the application based on the generated profile related to the application.

18. The method of claim 12, wherein the limited function comprises at least one of a communication function, a sound function, a notification function, a log output function, a function of reporting errors occurring during execution, or a function of controlling devices included in the electronic device.

* * * * *